Patented Apr. 1, 1930

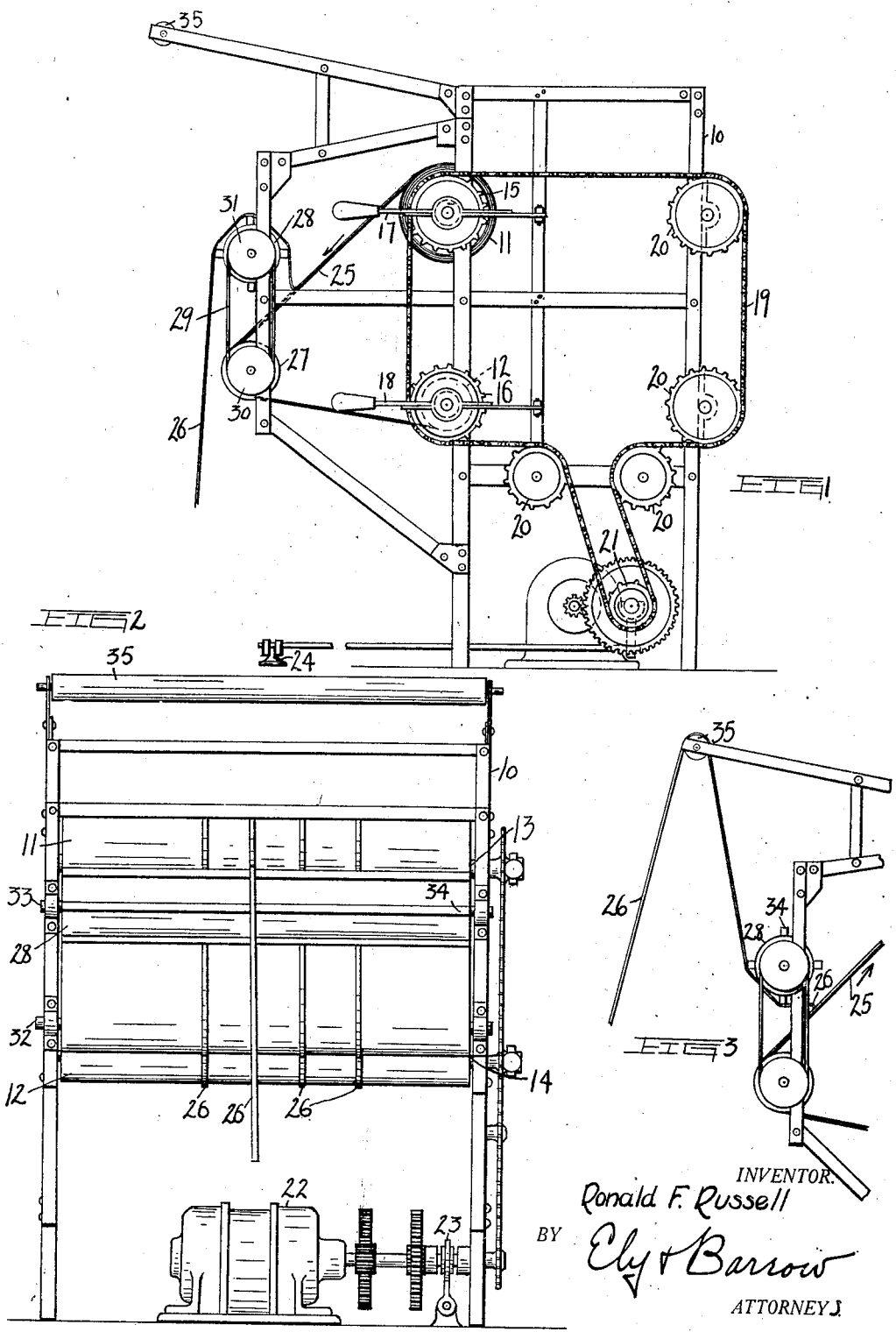

1,753,174

UNITED STATES PATENT OFFICE

RONALD F. RUSSELL, OF AKRON, OHIO, ASSIGNOR TO THE FIRESTONE TIRE AND RUBBER COMPANY, OF AKRON, OHIO, A CORPORATION OF OHIO

STRIP-PULLING DEVICE

Application filed August 6, 1927. Serial No. 211,216.

This invention relates to devices for pulling strips, bands, or web material of low tensile strength from power driven stock supply rolls.

In the rubber industry tacky, unvulcanized, continuous rubber strips or bands are wound onto supply rolls, with a liner of muslin to prevent successive convolutions of the material from adhering to each other. During assembling operations where such strip stock is continuously fed off of the supply rolls, it has been necessary to employ an operator to unwind the roll and separate the material from the liner to which it adheres rather strongly. Usually a number of such strips are spaced laterally across the width of the liner fabric and, as the latter is drawn from the supply roll onto another roll, an operator feeds off one of the rubber strips to be supplied to an assembling conveyor where various operations are to be performed, such as assembling side wall and chafer strips or tread gum, breaker and cushion strips for automobile tires. Only one of the strips is pulled off at a time, the remainder of the bands being rewound with the liner. The liner is then reversed and another strip is removed while the liner is passing in a reverse direction. This manual removal is accomplished by giving the material intermittent and sudden jerks to separate the strongly adhering rubber from the liner, since a steady pull of sufficient force to separate the strip would distort or break the latter. The present invention is intended to take the place of the operator who pulls the rubber strip from the liner.

An object of the invention is to provide power driven means for unwinding a supply roll, separating a strip of material from a liner, and rewinding the liner. Another object of the invention is to provide strip pulling means simulating the manual action of separating the strip from the liner by intermittent jerks.

The foregoing and other objects are obtained by the device illustrated in the accompanying drawings and described below. It is to be understood that the invention is not limited to the specific form thereof described herein.

Of the accompanying drawings:
Figure 1 is a side elevation of a machine embodying the principles of the invention;
Figure 2 is a front elevation thereof; and
Figure 3 is an elevational detail illustrating a different phase in the operation of the machine.

Referring to the drawings, 10 represents a frame having journaled therein a supply roll 11 and a rewind roll 12, the shafts 13 and 14 of which may be selectively brought into rotative engagement with driven sprockets 15 and 16 respectively, by means of suitable clutches operated by levers 17 and 18. A chain 19, trained around sprockets 15 and 16 and over idlers 20, is driven by sprocket 21, which is in turn driven through suitable reduction gearing by motor 22 when clutch 23 is thrown by pressing down pedal 24. A muslin liner 25, carrying strips or bands 26 of rubber or like stock, passes from supply roll 11 over a cylindrical roll 27, rotating the latter, and is rewound on roll 12. The rotation thus imparted to roll 27 is used to drive a feed roll 28 by means of a belt 29 trained over sheaves 30 and 31 attached to the shafts 32 and 33 of rolls 27 and 28 respectively, whereby the feed roll 28 for drawing strip stock off of the liner rotates at a speed governed by the speed of the liner. A steady pull of the feed roll 28 would cause distortion or breaking of strip stock having low tensile strength and this disadvantage is avoided by applying a plurality of paddles or ribs 34, relatively widely spaced apart on feed roll 28. The effect of these ribs is to give the strip material a series of intermittent jerks, simulating the manual method of removing the tacky material from a liner. An upper extension of frame 10 carries a guide roll 35, the function of which will be later explained.

In operation, a stock supply roll is placed in the machine on shaft 13, the liner drawn therefrom around roll 27, and fed onto an empty roll 12, handle 18 being thrown to permit driving of the latter roll while the supply roll idles. One or more of the strips 26 are separated from the liner and carried over feed roll 28 as shown in Figure 1, so that ribs 34 will pull the stock from the liner as explained above. Other strips 26 not required, are rewound with the liner. When the end of the liner is reached, its direction is reversed by engaging the clutch with shaft 13 to drive roll 11. A strip to be pulled off the liner is then passed under the feed roll and over guide roll 35, as illustrated in Figure 3, the guide roll thus serving to draw the strip around the under side of roll 28 in order that ribs 34 may engage the strip to remove the same from the liner passing in its reversed direction.

Modifications of the structure herein disclosed may be resorted to without departing from the spirit of the invention or the scope thereof as defined by the appended claims.

What is claimed is:

1. In combination with a strip material carrying liner, a pair of rolls on which said liner may be alternately wound, a rotatable feed roll for removing a strip from said liner, means operated by the passage of the liner for rotating said feed roll, and a rib on the feed roll for imparting intermittent jerks to the strip material to break adhesion thereof to the liner.

2. In combination with a strip material carrying liner, means for removing a strip from said liner by imparting intermittent jerks to the strip material to break adhesion thereof to the liner, means for passing said liner adjacent said strip removing means, and means operated by the passage of the liner for rotating said strip removing means.

RONALD F. RUSSELL.